April 19, 1938.  W. SCHAELCHLIN  2,114,859
SYNCHRO-TIE FOR SHIP PROPULSION
Filed June 30, 1936
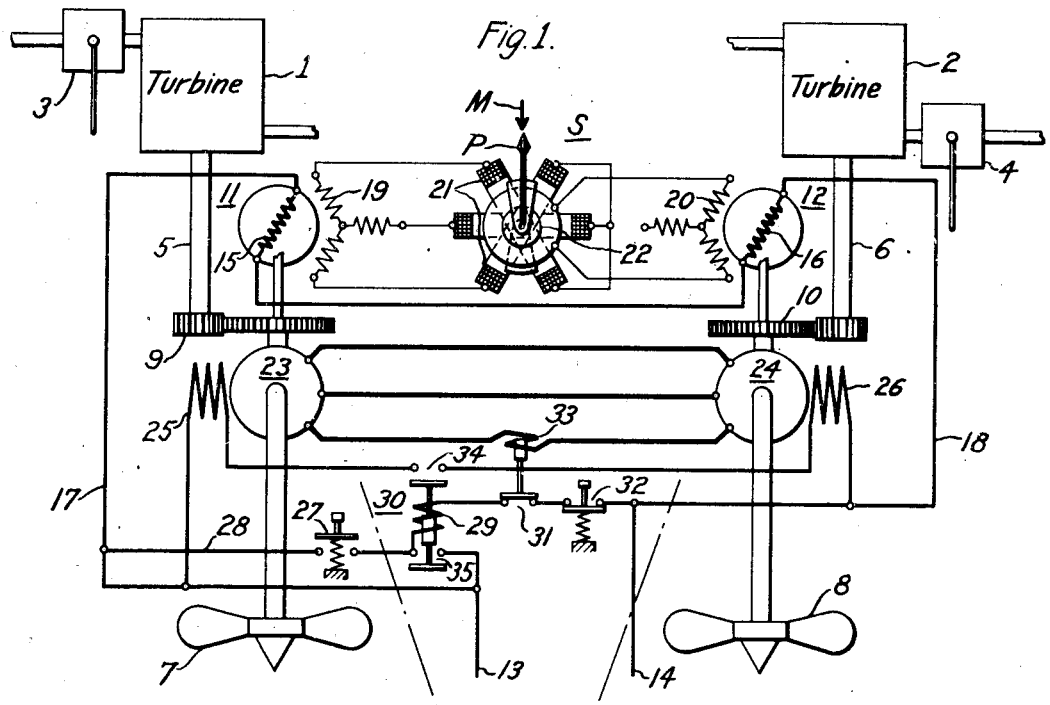
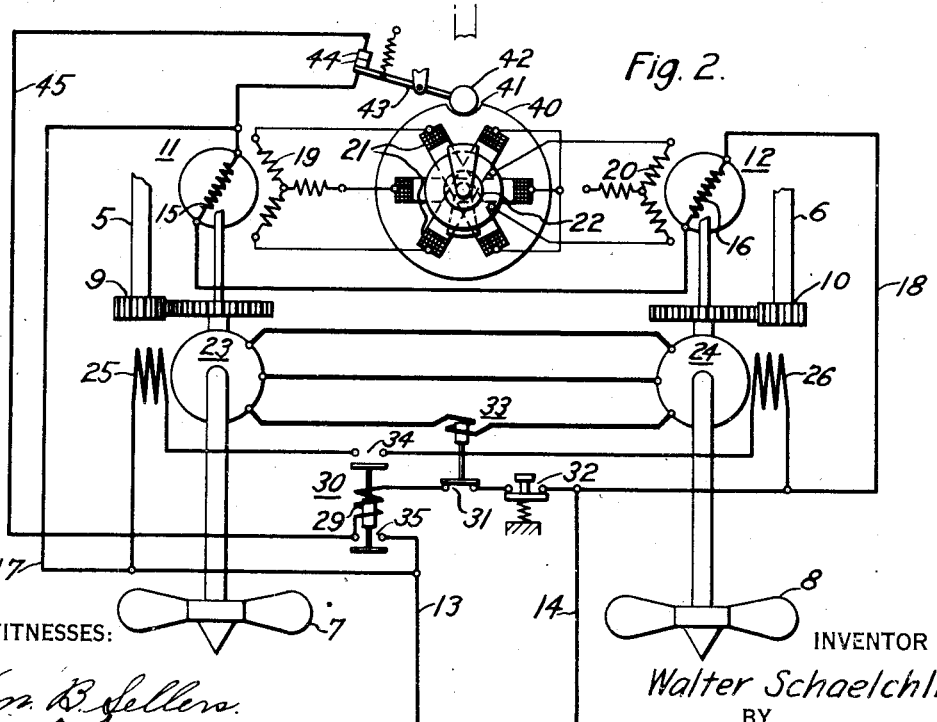
WITNESSES:
Wm. B. Sellers
Nw. C. Groome
INVENTOR
Walter Schaelchlin.
BY
Paul E. Friedemann
ATTORNEY Patented Apr. 19, 1938

2,114,859

UNITED STATES PATENT OFFICE 2,114,859

SYNCHRO-TIE FOR SHIP PROPULSION

Walter Schaelchlin, Wilkinsburg, Pa., assignor to Westinghouse Electric & Manufacturing Company, East Pittsburgh, Pa., a corporation of Pennsylvania Application June 30, 1936, Serial No. 88,102

1 Claim. (Cl. 172—293)

This invention relates to the control of operation of two or more machine elements, and more particularly relates to a system of control for maintaining two or more shafts in a predetermined relationship during synchronous operation.

In a system where two or more shafts are operated by prime movers having periodically varying driving torques, as Diesel engines or any reciprocating engines have, and also where the driven shafts operate loads, such as pumps or propellers, that have a periodically varying characteristic, vibrations are easily set up between the moving parts and the building structure, or foundation. Such vibrations, aside from being very annoying, may give rise to resonance and thus endanger the foundation and equipment.

On board ship, such resonance is especially annoying as well as dangerous. The tendency to produce vibrations on board ship is especially great because the moving parts are heavy and the load changes rather pronounced relative the foundation, or frame structure; the propeller blades, if operating in synchronism and out-of-phase, cause a reciprocating force to act on the ship; and, on Diesel engine operated ships, or, for that matter, on ships using any reciprocating engine, the prime movers cause reciprocating forces to act on the ship.

One object of this invention is to provide for maintaining a selected phase relation between two or more devices operating synchronously.

Another object of this invention is to provide for electrically maintaining two or more shafts in any selected relationship during synchronous operation.

A still further object of this invention is to provide means for automatically selecting and maintaining synchronous out-of-phase operation of a plurality of shafts.

It is also an object of this invention to provide for automatically selecting and maintaining synchronous in-phase operation of a plurality of shafts.

Other objects and advantages will become more apparent from a study of the following specification when considered with the accompanying drawing, in which:

Figure 1 is a diagrammatic showing of an embodiment of this invention, illustrating manually operable means for effecting the synchronous operation of a pair of shafts so as to keep a selected relative position during such operation; and Fig. 2 is a diagrammatic showing of a modification of this invention, illustrating means for automatically effecting synchronous out-of-phase or, if desired, in-phase, operation of a pair of shafts.

Referring to Fig. 1, the reference characters 1 and 2 designate prime movers. These prime movers may be Diesel engines, reciprocating steam engines, or turbines, as shown. The turbines shown have the conventional governor controlled intake valves 3 and 4 and have their shafts 5 and 6 mechanically coupled to the propellers 7 and 8 through transmission gearing 9 and 10.

A synchronous generator 11 is mechanically coupled to the propeller 7 and thus generates an alternating current having a frequency that is a measure of the speed of propeller 7.

A synchronous generator 12 is mechanically coupled to the propeller 8 and thus generates an alternating current having a frequency that is a measure of the speed of the propeller 8.

A suitable source of direct current, evidenced by the buses 13 and 14 provides direct current excitation to the field windings 15 and 16 of the synchronous generators 11 and 12. The energizing circuit may be traced from bus 13 through conductor 17, field winding 15 from the upper terminal to the lower terminal, field winding 16 from the lower terminal to the upper terminal and conductor 18 to the bus 14. Since the field windings 15 and 16 are connected in series and have the windings on corresponding pole pieces connected for opposite polarities the alternating currents generated by the generators 11 and 12 can, for a two pole machine, be at the same frequency and in phase electrically when corresponding pole pieces of the generators are out-of-phase mechanically.

To indicate such out-of-mechanical-phase position of corresponding pole pieces of the two pole generators 11 and 12, the armature windings 19 and 20 are interconnected respectively with the actuating coils 21 and 22 of a well known synchroscope S. The core structure for coil 22, which is the movable coil, is provided with a pointer P adapted to coact with a stationary mark M. When the generators 11 and 12, during operation, are not operating at exactly the same speed, the pointer P will rotate and its direction of rotation will be determined by the generator having the greater speed. When the generators 11 and 12 rotate at exactly the same speed the alternating current generated by the generators will have the same frequency and will be in phase. The synchroscope S will thus indicate synchronous operation of the generators because the pointer P will be stationary opposite stationary mark M.

When the pointer P becomes stationary or substantially stationary opposite the mark M, corresponding pole pieces will be out-of-mechanical-phase. In ship propulsion systems it is desirable that corresponding points on corresponding propeller blades move toward the hull at the same instant and away from the hull at the same instant. This means that the water will be thrown against the hull at both sides at the same time. Looking toward the propellers from the stern, the propellers will be seen to rotate in opposite directions. By means of the synchroscope not only is synchronous operation indicated but a predetermined relationship between the propeller blades is indicated.

The mechanical interconnection of the rotors of the generators 11 and 12 with the respective propellers 7 and 8 is preferably such that the synchroscope will indicate, when pointer P is opposite mark M, in-phase operation of the propellers but out-of-mechanical-phase operation of the prime movers.

If, at the instant the propellers are mechanically in phase position, means were provided for maintaining such relation regardless of speed variations of the propellers, resonance can be eliminated. Resonance will not occur because none of the vibrating or oscillating parts of the entire system will have the same direction of motion at the same time.

This invention provides for substantially locking the propellers in any selected phase position. Such operation is accomplished by the proper control of two synchronous generators mechanically coupled directly to the propellers. These generators 23 and 24 have their rotating armature windings connected directly to each other. Any non-synchronous operation of the generators, when the field windings 25 and 26 are energized, will cause heavy circulating currents to flow in the armatures of the two generators. A heavy torque is thus produced on the propellers to prevent them from taking any other relative position than the position determined by the generators 23 and 24.

To establish the controlling interconnection of generators 23 and 24 the attendant watches the pointer P of the synchroscope and when the pointer P is opposite the mark M and substantially stationary, he actuates the push button switch 27. Operation of this switch 27 establishes a circuit from bus 13 through conductors 17 and 28, switch 27, actuating coil 29 of the field contactor 30, contact members 31 of the overload control relay 33, and stop push button 32 to the bus 14. The field windings 25 and 26 are thus energized from buses 13 and 14 by the operation of the field contactor 30. The circuit may be traced from bus 13 through conductor 17, the field winding 25, contact members 34 of the field contactor 30, field winding 26, and conductor 18 to bus 14. The field windings 25 and 26 thus become energized at a time when the propellers are mechanically in phase position and the generators, as long as there is no tendency for the propellers to become displaced will operate at no-load.

If propeller 7 tends to lag or pull out of its positional relationship to shaft 8, the dynamo-electric machine 23 becomes a motor and dynamo-electric machine 24 becomes a generator. The speed of propeller 7 is thus increased and the speed of propeller 8 is decreased. Synchronous operation of the propellers is thus maintained and also the phase relation is maintained.

In Fig. 2 a modification is shown for automatically accomplishing the novel results hereinbefore discussed. For the same elements the same reference characters used in Fig. 1 are applied and different reference characters are only used for elements that are distinctly different.

Instead of using a push button switch that is to be operated by the attendant when the synchroscope indicates synchronous in-phase operation of the propellers, the synchroscope can be operatively so related to the field contactor 30 that the field windings 25 and 26 are automatically energized when the proper position obtains between propellers 7 and 8.

In the modification shown in Fig. 2 all the elements function exactly as described in connection with Fig. 1 except that the control of the field contactor 30 is automatic. Assuming that the propellers 7 and 8 are to be brought in the desired operating relation. In such case one prime mover may be caused to operate at normal speed whereas the other is made to vary its speed to search for the proper operating conditions. When the two propellers are in the correct position the cam 40, which is mounted to operate like pointer P, slows down and the notch 41 is brought in position so that roller 42 drops into the notch and, since the operating conditions are nearly right, roller 42 will remain in the notch 41 long enough so that the field contactor 30 is caused to operate.

The roller 42 is mounted on the spring biased pivoted lever 43 and when the roller 42 rests in notch 41, contact members 44 are engaged. A circuit is thus established from bus 13 through conductor 17, contact members 44, conductor 45, actuating coil 29 of field contactor 30, contact members 31 of overload control relay 33 and stop push button switch 32 to the bus 14. The field windings 25 and 26 are thus automatically energized at the proper instant and the propellers will thereafter operate in synchronism but mechanically in an in-phase position.

Operation of the field contactor 30 causes the closing of contact members 35 whereupon a holding circuit is established for the actuating coil 29 and field contactor thus remains in its operated position independent of the position of push button switch 27, or contact members 44, depending on whether manual or automatic control is used.

When the propellers tend to pull out of their predetermined relative position heavy circulating currents flow in the armatures of the dynamo-electric machines 23 and 24 with the result that contact members 31 are opened. The field windings 25 and 26 are thus deenergized and the controlled operation of the propellers stops. Operation of stop push buttons 32 will similarly stop the controlled operation of the propellers.

The embodiment and the modification hereinbefore described and shown in Figs. 1 and 2 respectively are thought to be merely illustrative of this invention. Because others skilled in the art, particularly after having had the benefit of the teachings of this invention, can readily devise other circuit diagrams and other modifications for accomplishing the novel results of this invention. This invention is, therefore, not to be limited to the specific showings made, but is only to be limited by pertinent prior art and the appended claim.

I claim as my invention:

In a system of control for controlling the operation of a pair of shafts, in combination, a prime mover mechanically coupled to one of the shafts for driving the same, a second prime mover mechanically coupled to the other of said shafts for driving the same, a pair of electric generators coupled to the respective shafts and each having armature windings adapted to generate alternating currents, the frequencies of which are proportional to the speeds of the respective shafts, field windings for each of said generators mounted on the rotating elements of the generator, a source of direct-current electric energy, said field windings of the respective generators being so connected to the source of direct-current energy that corresponding pole pieces for the field windings of the respective generators are of opposite polarity and the rotating elements of the generators will, therefore, be in an out-of-mechanical phase position when the currents generated in the armature windings of the two generators are of the same frequency and in phase electrically, a synchroscope having a pair of windings connected to said respective armature windings of said generators adapted to indicate when the currents generated in the armature windings of the generators are of the same frequency and in phase electrically, a pair of synchronous dynamo-electric machines having their rotating elements coupled to two shafts mechanically coupled, respectively, to said pair of shafts and having their armature windings interconnected and mounted on the rotating elements thereof, said dynamo-electric machines having field windings on the stationary elements of the respective dynamo-electric machines, and means responsive to the operation of said synchroscope adapted to energize said field windings of said dynamo-electric machines at an instant when said first-mentioned pair of shafts are in an out-of-mechanical phase position.

WALTER SCHAELCHLIN.